Sept. 25. 1928. J. C. MILES Re. 17,089

HOT AIR HEATING AND VENTILATING APPARATUS

2 Sheets-Sheet 1

Original Filed July 9, 1923

INVENTOR

James C. Miles

By Parker & Macklin,

ATTYS.

Sept. 25, 1928. J. C. MILES Re. 17,089

HOT AIR HEATING AND VENTILATING APPARATUS

Original Filed July 9, 1923 2 Sheets-Sheet 2

INVENTOR
James C. Miles
BY Bakie & Macklin,
ATTYS.

Reissued Sept. 25, 1928.

Re. 17,089

UNITED STATES PATENT OFFICE.

JAMES C. MILES, OF CLEVELAND, OHIO.

HOT-AIR HEATING AND VENTILATING APPARATUS.

Original No. 1,600,508, dated September 21, 1926, Serial No. 650,249, filed July 9, 1923. Application for reissue filed June 7, 1928. Serial No. 283,673.

This invention relates to apparatus used in hot air heating systems, and more particularly refers to an apparatus which may be used in such a system as is shown and described in my application, Serial No. 430,160, filed December 13, 1920, issued September 16, 1924, Patent No. 1,508,813.

Briefly, the apparatus, illustrated in my patent, embodies a fan and a damper, which are arranged to be positioned adjacent the inlet to the heating chamber of a furnace. The damper is arranged to be opened when the fan is stopped and to be closed when the fan is in operation, wherefore, the openings occupied by the fan and damper provide passageways for air when the fan is stopped, while the opening occupied by the fan comprises the only inlet when the fan is in operation. Thus when the fan is stopped, the furnace is operating on a "gravity" system, and when the fan is in motion, the furnace is operating on a "forced air" system.

One of the objects of this invention is the provision of means operable independently of the air pressure for effecting a positive closure of the damper when the fan is turned on, and to obtain a positive opening of the damper when the fan is turned off.

I carry out the above object by employing preferably electromagnetic means which is electrically connected with the fan motor wherefore the operation of a single switch, automatically shuts off the fan and opens the damper and vice versa.

The means for accomplishing the above object will be hereinafter more fully described in connection with the accompanying drawings, and the essential features of my invention will be summarized in the claims.

Figure 1:
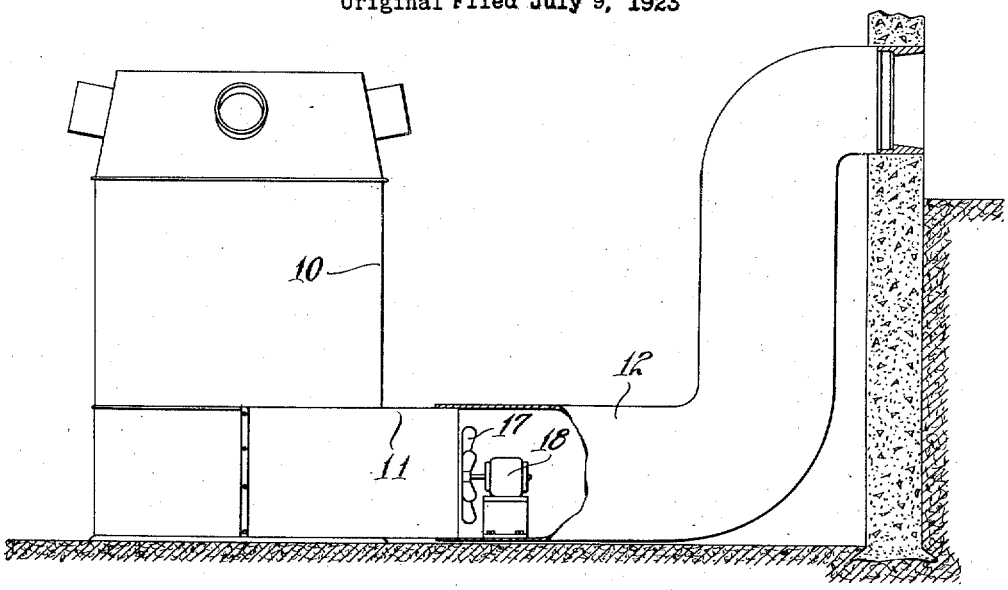
Figure 2:
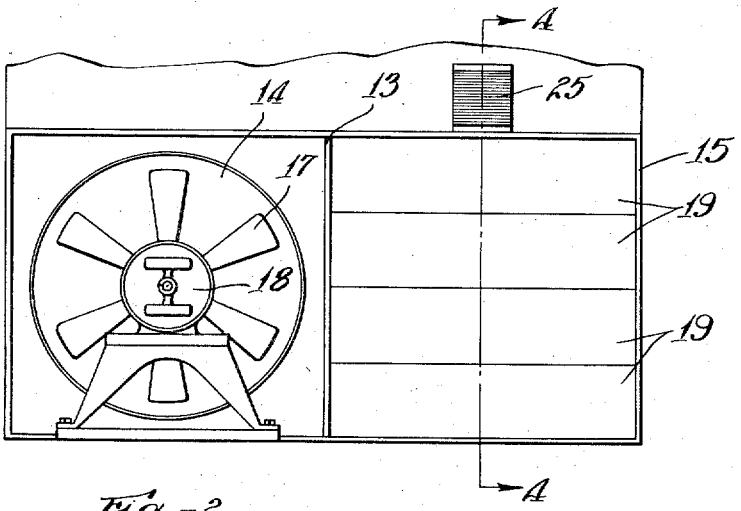
Figure 3:
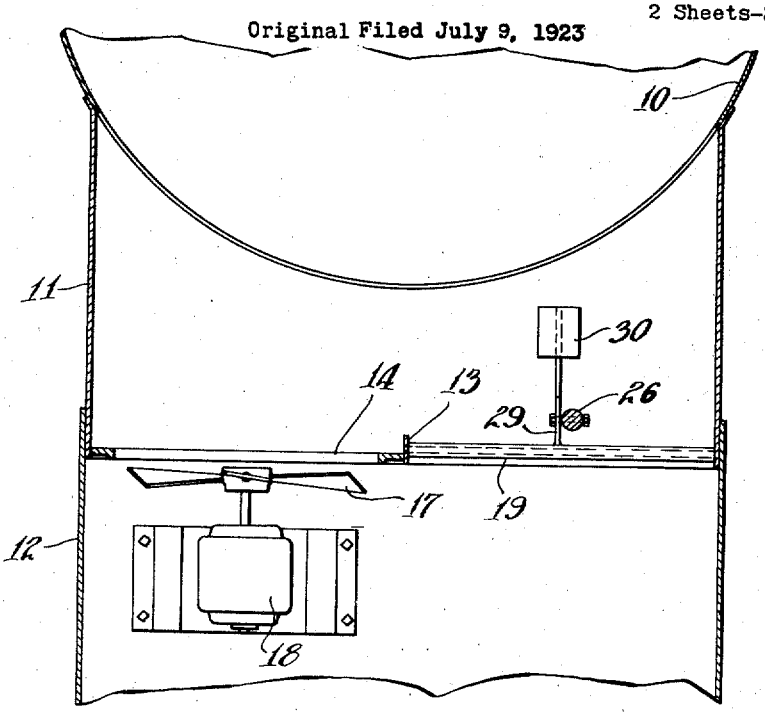
Figure 4:
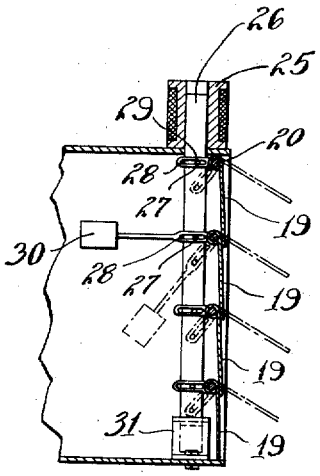
Figure 5:
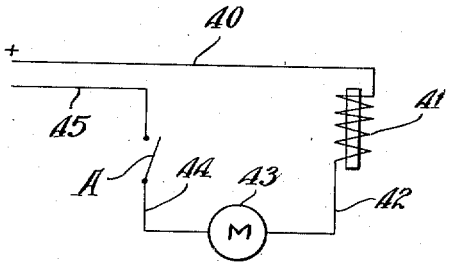

In the drawings, Fig. 1 is a side elevation of a furnace, showing a conduit leading thereto, and illustrating my invention within the conduit; Fig. 2 is a rear elevation of a unit embodying my invention; Fig. 3 is a horizontal section taken through the conduit leading to the furnace; Fig. 4 is a section taken on the correspondingly numbered line in Fig. 2; Fig. 5 is a wiring diagram.

In Fig. 1, I have shown the heating chamber of a hot air furnace at 10, with an inlet housing 11, and an inlet conduit 12. Disposed across the inlet openings and adjacent the casing 11, I have illustrated a frame 13 which is preferably provided with openings 14 and 15 respectively. Adjacent the opening 14, I have shown a fan 17, which is adapted to be operated by a motor indicated generally at 18. Disposed across the opening 15, I have shown dampers 19 which are pivoted at 20, to the frame. Suitable mechanism for automatically opening the dampers simultaneously when the fan is turned off, is provided wherefore sufficient area for the admission of air to the heating chamber is obtained to prevent overheating or burning out of the furnace when the fan is stopped.

To effect an automatic operation of the dampers, consequent upon starting and stopping of the fan, I provide electromagnetic means which may be electrically connected to the motor, wherefore, the operation of a single switch effects a simultaneous operation of the dampers and fan.

The preferred arrangement is indicated in Figs. 2 and 4, wherein a solenoid 25 is disposed above the frame and centrally of the dampers. A core 26 extends vertically through the solenoid and is operatively connected with the dampers as by a pin and slot connection 27 and 28 respectively.

A slot is illustrated in each arm 29 which may extend laterally from the dampers. Normally, the dampers are held in open position, as shown by the broken lines in Fig. 4, by a counterweight 30, which may be carried on an extension of one of the arms. In this position, the solenoid core 26 is in a downward position.

When the furnace is operating on the "gravity" system, the dampers are open and the fan is turned off. To effect a closure of the dampers when the fan is turned on, the solenoid winding is connected in series with the motor, wherefore, the solenoid is energized when the motor is turned on. The winding of the solenoid is such that the core 26 is adapted to be raised for closing the dampers when the current is turned on. A suitable bracket 31 adjacent the bottom of the frame provides a satisfactory bearing or guide for the moving core.

Assuming that a device embodying my invention is disposed across the inlet to the heating chamber of the furnace, and assuming further that switch A is closed, then the current will flow as follows. Line 40, solenoid winding 41, line 42, motor 43, line 44, switch A, and line 45. Lines 40 and 45 are connected to a suitable source of electrical supply (not shown). When the motor is in operation therefore, the solenoid is energized and the core 26 is maintained in the uppermost position wherefore the dampers 19 are closed. As soon as the switch A is opened, then the solenoid is deenergized, wherefore the counterweight 30 being heavier than the damper, moves downwardly and thus opens the dampers, as shown by the broken lines in Fig. 4.

In view of the foregoing description, it will be seen that my invention provides a damper which is electrically closed when the fan is turned on and which is automatically opened when the fan is turned off. An advantage of this arrangement is that a single switch may be employed for controlling the operation of both fan and damper, and that a positive operation is effected for preventing burning out of the furnace in the event the electrical apparatus should fail.

It will also be evident that my invention provides for the automatic closing of the damper, when the fan is started, independently of the air pressure which may be built up in the heating chamber, and that the automatic closing of such damper independently of such pressure is the essence of this invention.

I claim:

1. In a heating apparatus, the combination with a heating chamber of a fan for forcing air into said chamber, a normally open damper associated with the fan for controlling an inlet to the chamber, and means associated with the damper and operatively connected with the fan, whereby upon operation of the fan a positive automatic closure of said damper is effected, and whereby the damper is maintained closed so long as the fan is in operation.

2. In a heating apparatus, the combination with a heating chamber of a fan for forcing air into said chamber, a normally open damper associated with the fan and controlling an inlet to the chamber, and electromagnetic means associated with the damper and electrically connected with the fan whereby upon operation of the fan a closure of said damper is effected.

3. In combination, a heating chamber having an air inlet with a damper opening and a fan opening, a fan for forcing air into the chamber through the inlet, a damper associated with said inlet, the damper being normally open so that when the fan is not in operation, air passes into the chamber through both the damper opening and the fan opening, and electromagnetic means for automatically closing the damper when the fan is turned on whereby all of the air entering the chamber then flows through the fan opening.

4. In a heating apparatus, the combination with a heating chamber having an air inlet, of a frame positioned across the inlet, a fan mounted within the frame, a damper intermediate the fan and one side of the frame, said damper being normally open when the fan is inoperative, and electromagnetic means for automatically closing the damper when the fan is set in operation.

5. In a heating apparatus, the combination with a heating chamber having an air inlet, of a rectangular frame positioned across the inlet and occupying substantially the entire area thereof, a motor driven fan mounted within the frame, a yieldable normally open damper carried by the frame and disposed on one side of the fan, whereby air may enter the chamber through the damper opening when the fan is turned off, and electromagnetic means for automatically closing the damper when the fan is in operation.

6. The combination with the heating chamber of a hot air furnace having an inlet thereto, of a frame positioned across the inlet to said chamber, a damper pivoted to the frame, mechanical means for normally holding said damper in open position, a fan for forcing air into said chamber, and electromagnetic means for automatically closing the damper when the fan is in operation.

7. The combination with the heating chamber of a hot air furnace having an inlet thereto, of a frame disposed across the inlet to said chamber, a fan mounted adjacent said frame, a damper pivoted to the frame at one side of the fan, gravitational means for normally holding the damper in open position when the fan is stopped, and electromagnetic means for enabling the damper to be automatically closed when the fan is in operation.

8. The combination, with the heating chamber of a hot air furnace having an inlet thereto, of a frame disposed across the inlet to said chamber, a damper pivoted to the frame, a counter weight on one side of the pivotal connection for normally holding the damper in open position, a fan for forcing air through the inlet into the chamber, said damper being normally open when the fan is turned off, a solenoid electrically connected with the fan, a core for said solenoid projecting across the damper, and means operatively connecting the core with said damper whereby vertical movement of the core controls the operation of said damper, whereby the damper is automatically closed upon operation of the fan.

9. The combination with the heating chamber of a hot air furnace having an inlet thereto, of a frame disposed across the inlet, a damper pivoted to the frame, a motor driven fan disposed adjacent said frame for forcing air into the chamber, a solenoid carried by the frame and electrically connected with said fan, a core for said solenoid disposed vertically across the damper, and being operatively connected therewith, said core being in lowermost position when the current of the motor is turned off, and the connection between the core and damper being such that the damper is open when the current is turned off, and is closed when the current is turned on.

10. The combination with the heating chamber of a hot air furnace having an inlet thereto, of a frame disposed across the inlet and having two openings therein, a motor driven fan disposed adjacent one of said openings for forcing air into the chamber, a damper pivoted to the frame adjacent the other of said openings, a vertically movable member having a lost motion connection with the damper, a solenoid surrounding the member and being electrically connected with the motor, a counterweight carried by the damper for normally holding it in open position when the fan is turned off whereby all of the air entering the chamber passes through both the fan and damper openings, and said member being so arranged that the damper is closed when the solenoid is energized and the fan is in operation, whereby all of the air then flows only through the fan opening.

11. In a heating apparatus, the combination with a heating chamber, having an air inlet of a fan and a damper associated with the inlet, the fan functioning when in operation to force air into said chamber, and the damper functioning to restrict the effective area of the inlet opening when the fan is in operation, and to enlarge it when the fan is stopped, and means operating independently of air pressure in the chamber for automatically closing the damper when the fan is started, and for opening the damper when the fan is stopped.

12. In a heating apparatus, the combination with the heating chamber of a hot air furnace having an air inlet conduit leading thereto, a frame associated with the conduit and having a fan opening and a damper opening therein, a fan carried by the frame adjacent the fan opening, and a damper carried by the frame adjacent the damper opening, said fan functioning when in operation to force air into said chamber for changing the operation of the heating apparatus from a gravity to a forced air system, and means operating independently of air pressure in said chamber for automatically closing the damper when the fan is started.

13. In a heating apparatus, the combination with the heating chamber of a hot air furnace, having an air inlet conduit leading thereto, a frame associated with the conduit and having a fan opening and a damper opening therein, a fan carried by the frame adjacent the fan opening, and a damper carried by the frame adjacent the damper opening, said damper comprising a series of members mounted for pivotal movement on parallel axes, means for moving the members as a unit to open and close the damper, said fan functioning to force air into the chamber under pressure, and thereby to change the operation of the heating apparatus from a gravity to a forced air system, and mechanism for operating said means to automatically close the damper when the fan is started.

14. In a heating apparatus, the combination with the heating chamber of a hot air furnace having an air inlet thereto, of a member disposed across the inlet and having two openings therein, a motor driven fan associated with one of the openings, a damper pivotally mounted on said member, and associated with the other opening, the fan being adapted, when in operation, to force air into said chamber for increasing the air pressure therein and for changing the operation of the furnace from a gravity to a forced air system, mechanism operating independently of the air pressure in said chamber for automatically operating the damper to restrict the effective area of said inlet while the fan is in operation, whereby, all of the air entering the heating chamber is caused to flow only through the fan so long as the fan is in operation.

In testimony whereof, I hereunto affix my signature.

JAMES C. MILES.